(12) United States Patent
Kalhan (10) Patent No.: US 10,804,999 B2
(45) Date of Patent: *Oct. 13, 2020

(54) ROBUST RELAY RETRANSMISSIONS WITH DUAL-CODING

(71) Applicants: Amit Kalhan, San Diego, CA (US); Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 16 days.

This patent is subject to a terminal disclaimer.

(21) Appl. No.: 16/319,741

(22) PCT Filed: May 25, 2017

(86) PCT No.: PCT/US2017/034412
§ 371 (c)(1),
(2) Date: Jan. 22, 2019

(87) PCT Pub. No.: WO2018/026426
PCT Pub. Date: Feb. 8, 2018

(65) Prior Publication Data
US 2019/0238212 A1 Aug. 1, 2019

Related U.S. Application Data

(60) Provisional application No. 62/369,489, filed on Aug. 1, 2016.

(51) Int. Cl.
*H04B 7/155* (2006.01)
*H04L 1/00* (2006.01)
*H04W 52/48* (2009.01)

(52) U.S. Cl.
CPC ...... *H04B 7/15528* (2013.01); *H04B 7/15521* (2013.01); *H04L 1/0009* (2013.01); *H04W 52/48* (2013.01)

(58) Field of Classification Search
CPC .......................... H04W 52/48; H04L 1/0009
See application file for complete search history.

(56) References Cited

U.S. PATENT DOCUMENTS 5,392,299 A * 2/1995 Rhines ............... G11B 20/1866
714/756
5,570,389 A * 10/1996 Rossi ..................... H04L 1/188
375/220

(Continued)

FOREIGN PATENT DOCUMENTS

KR 10-2008-0040447 A 5/2008

*Primary Examiner* — Jamaal Henson (57) ABSTRACT

A signal forwarding device receives a dual-encoded first set of data that is encoded according to first and second sets of encoding parameters. The signal forwarding device decodes the dual-encoded first set of data, using decoding parameters that correspond to the second set of encoding parameters, to generate a single-encoded first set of data that is encoded according to the first set of encoding parameters. The signal forwarding device transmits the single-encoded first set of data to the destination device, which decodes the single-encoded first set of data using decoding parameters that correspond to the first set of encoding parameters. If the decoding is unsuccessful, the destination device requests retransmission. The signal forwarding device decodes a stored copy of the single encoded first set of data, using decoding parameters that correspond to the first set of encoding parameters, and retransmits the first set of data to the destination device.

19 Claims, 3 Drawing Sheets (56) References Cited

U.S. PATENT DOCUMENTS

| | | |
|---|---|---|
| 2011/0158295 A1 | 6/2011 | Shiizaki |
| 2012/0008545 A1* | 1/2012 | Zhang ................... H04L 1/1829 370/315 |
| 2012/0020279 A1 | 1/2012 | Kim et al. |
| 2012/0140796 A1 | 6/2012 | Dai et al. |
| 2013/0195106 A1* | 8/2013 | Calmon .................. H04L 69/14 370/389 |
| 2017/0237652 A1* | 8/2017 | Calmon .................. H04L 45/24 370/315 |

* cited by examiner

ROBUST RELAY RETRANSMISSIONS WITH DUAL-CODING

CLAIM OF PRIORITY

The present application claims priority to Provisional Application No. 62/369,489, entitled "ROBUST RELAY RETRANSMISSIONS WITH DUAL-CODING," filed Aug. 1, 2016, assigned to the assignee hereof and hereby expressly incorporated by reference in its entirety.

FIELD

This invention generally relates to wireless communications and more particularly to dual-coding transmissions to a signal forwarding device.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station, which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF), and decode and forward (DF) schemes.

SUMMARY

A signal forwarding device receives a dual-encoded first set of data. The dual-encoded first set of data is encoded according to a first set of encoding parameters that correspond to channel conditions associated with a first communication link between the signal forwarding device and a destination device. The dual-encoded first set of data is further encoded according to a second set of encoding parameters that correspond to channel conditions associated with a second communication link between an origination device and the signal forwarding device. Upon receipt of the dual-encoded first set of data, the signal forwarding device decodes the dual-encoded first set of data, using decoding parameters that correspond to the second set of encoding parameters, to generate a single-encoded first set of data that is encoded according to the first set of encoding parameters. The signal forwarding device transmits the single-encoded first set of data to the destination device, which attempts to decode the single-encoded first set of data using decoding parameters that correspond to the first set of encoding parameters. If the decoding is successful, the destination device has successfully received the first set of data. If, however, the decoding is unsuccessful, the destination device requests retransmission from the signal forwarding device. In response to the retransmission request, the signal forwarding device retrieves a stored copy of the single encoded first set of data from a memory of the signal forwarding device. The signal forwarding device decodes the retrieved copy of the single encoded first set of data, using decoding parameters that correspond to the first set of encoding parameters, and retransmits the first set of data to the destination device.

DETAILED DESCRIPTION

As discussed above, communication systems often employ repeaters, relays and self-backhauled base stations to forward signals transmitted between base stations and the UE devices served by the base stations. Signals may be forwarded from the base station to the UE device, from the UE device to the base station, or both. In some systems, scheduling of communication resources for the communication channel between the signal forwarding device (e.g., repeater, relay, etc.) and the UE device is performed by a scheduler at the base station or a central scheduler connected to the base station. In the examples discussed herein, it is assumed that the scheduler is located at, or connected to, a base station to/from which the signal forwarding device forwards signals. However, the scheduler may not be physically located at the base station and may be located at any other suitable location (e.g., at the signal forwarding device or elsewhere in the radio access network to which the base station belongs).

In a typical relay scenario, an anchor base station would only single-encode data, which is intended for a destination device, using encoding parameters that are appropriate for the channel conditions between the base station and the relay node. Upon receipt of the transmission from the base station, the relay node would decode the data and subsequently encode the data using encoding parameters that are appropriate for the channel conditions between the relay and the destination device (e.g., UE device). One drawback of such a scenario is the additional processing delay experienced at the relay while the relay encodes the data before transmitting the data to the destination device. Another drawback of a typical relay scenario would be the delay experienced when waiting for the origination device to retransmit a data packet that was not successfully received by the destination device. However, for the examples discussed herein, various methods, devices, and systems will be described in which (1) an anchor base station transmits a dual-encoded signal that does not require any encoding by the signal forwarding device (e.g., relay) in order to send an initial transmission of data to the destination device, and (2) the relay is capable of decoding the "inner" layer of encoding of the dual-encoded signal so that the relay can retransmit a data packet that was not successfully received by the destination device, without waiting for the base station to retransmit the data packet.

Since the signal forwarding device is central to the examples, the nomenclature used throughout the description centers on the signal forwarding device. More specifically, an "origination device" is a device from which a signal is transmitted to the signal forwarding device, and the signal being received at the signal forwarding device from an origination device is referred to as a "received signal." Similarly, a "destination device" is a device to which the signal forwarding device transmits a signal, which is referred to herein as a "forwarded signal." Moreover, although most of the following examples refer to a base station as the "origination device" and to a UE device as the "destination device," the examples may be modified so that the UE device is the "origination device," and the base station is the "destination device."

Figure 1A:
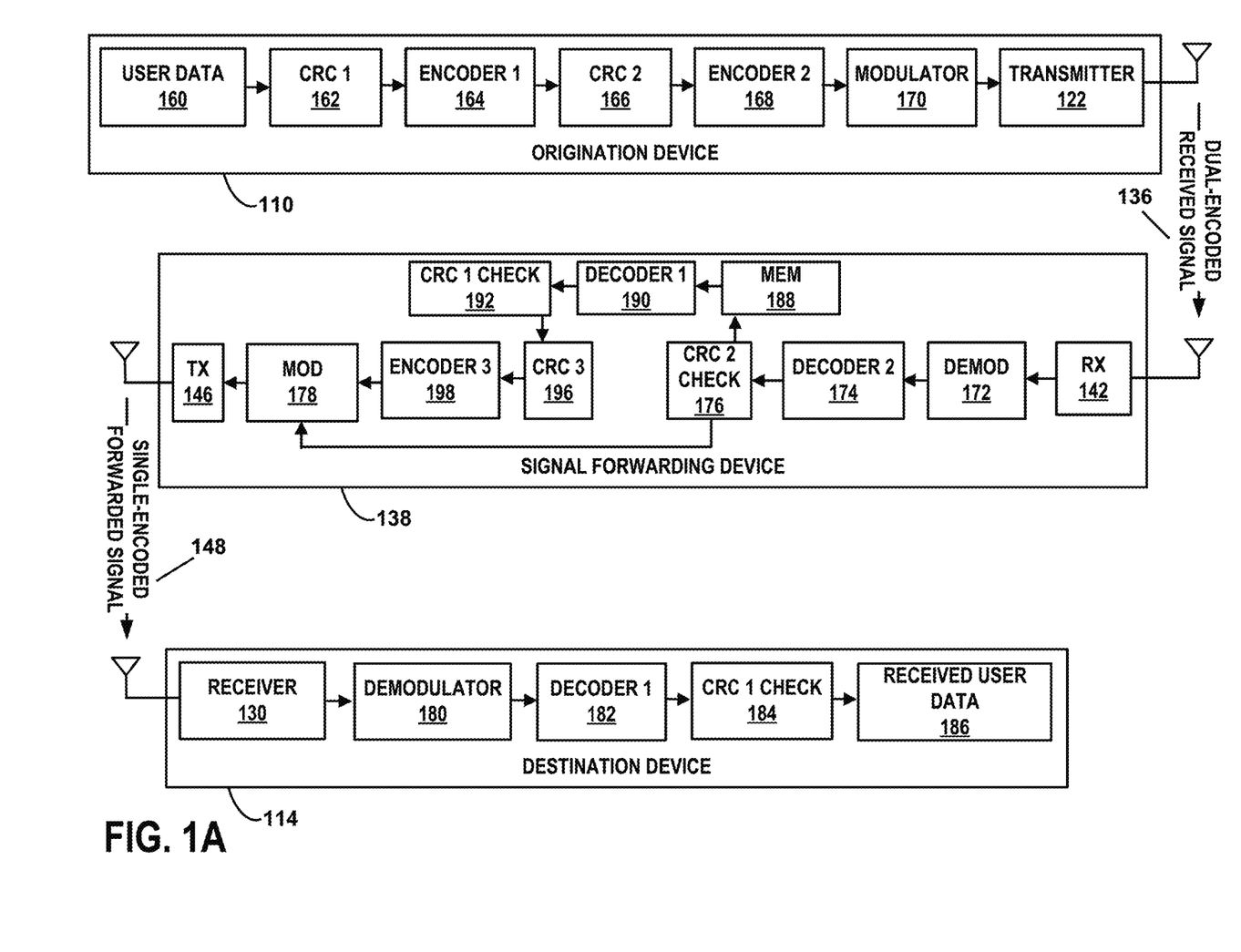
FIG. 1A is a block diagram of an example of the circuitry utilized within an origination device, a signal forwarding device, and a destination device to transmit dual-encoded data.

FIG. 1A is a block diagram of an example of the circuitry utilized within a dual-encoding origination device, a signal forwarding device, and a destination device to transmit multiuser packets. For example, the various blocks shown in FIG. 1A represent circuitry that is configured to perform various functions and processes described herein. Although each function is shown as a separate box, the circuitry that actually performs the recited functions for each box may be configured to perform the functions for multiple boxes. For example, a controller within the origination device, the signal forwarding device, and/or the destination device may be the circuitry that is configured to perform one or more of the functions shown in FIG. 1A.

The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices. In still other situations, the origination device 110 is a UE device, and the destination device 114 is a base station.

In the example of FIG. 1A, origination device 110 provides downlink wireless communication service to destination device 114. Thus, destination device 114 receives downlink signals from origination device 110, either directly or via signal forwarding device 138. In the example of FIG. 1A, origination device 110 transmits a dual-encoded data signal to signal forwarding device 138, and signal forwarding device 138 forwards a single-encoded data signal to the destination device 114.

For example, origination device 110 either generates the first set of user data 160 or receives the first set of user data 160 from another entity within the radio access network. In the example shown in FIG. 1A, the first set of user data 160 includes user data associated with one or more users. The origination device 110 has circuitry configured to add a first cyclic redundancy check value (CRC 1) 162 to the first set of user data. The CRC is an error-detecting code that is used to detect if the received data at the receiver is in error or not. Although the examples shown herein utilize CRC, any suitable error-detection techniques may be used.

After adding CRC 1, the first set of user data is encoded by Encoder 1, 164. Encoder 1 encodes the first set of user data according to a first set of encoding parameters corresponding to channel conditions associated with a first communication link between the signal forwarding device 138 and the destination device 114. The first set of encoding parameters comprises a first encoding technique and/or a first encoding rate. The result of encoding the first set of user data 160 with Encoder 1 is a single-encoded first set of user data.

In the example shown in FIG. 1A, a second CRC value (CRC 2) 166 is added to the single-encoded first set of user data. Although a CRC is used for CRC 2, any suitable alternative error-detection technique may be used in place of CRC 2. The single-encoded first set of user data, along with CRC 2, is encoded by Encoder 2, 168, which, in the example shown in FIG. 1A, utilizes a non-iterative type encoding/decoding (e.g., Reed-Solomon Codes) to ensure low-latency processing at the signal forwarding device 138. Encoder 2 encodes the single-encoded first set of user data according to a second set of encoding parameters corresponding to channel conditions associated with a second communication link between the origination device 110 and the signal forwarding device 138. The second set of encoding parameters comprises a second encoding technique and/or a second encoding rate. The result of encoding the single-encoded first set of user data with Encoder 2 is a dual-encoded first set of user data.

One of the advantages of dual-encoding the data is that the encoding parameters selected for each stage of encoding can be selected based on the channel conditions for a particular communication link. For example, Encoder 1 may encode the first set of user data according to an encoding technique that is better suited for transmissions between a signal forwarding device and a destination device (e.g., mobile UE device). Encoder 2 may encode the single-encoded first set of user data according to a second encoding technique that is better suited for transmissions between an origination device (e.g., base station) and a signal forwarding device. For example, the first encoding technique may utilize a convolutional coding, which is better suited for transmissions between a signal forwarding device and a destination device, and the second encoding technique may be a turbo coding or rate-less channel coding using the Low Density Parity Codes (LDPC), which is better suited for transmissions between an origination device and a signal forwarding device. However, any of the channel coding techniques may be used for the origination device-to-signal forwarding device channel or the signal forwarding device-to-destination device channel.

Similarly, Encoder 1 may encode the first set of user data at a coding rate that is better suited for transmissions between a signal forwarding device and a destination device (e.g., mobile UE device), and Encoder 2 may encode the single-encoded first set of user data at a different coding rate that is better suited for transmissions between an origination device (e.g., base station) and a signal forwarding device. More specifically, the first set of user data may be encoded at a 1/3 coding rate to obtain the single-encoded first set of user data, and the single-encoded first set of user data may be encoded at a 2/3 coding rate to obtain the dual-encoded first set of user data, for example.

Regardless of the particular encoding parameters used, the dual-encoded first set of user data is modulated by modulator 170 of origination device 110. In the example shown in FIG. 1A, Quadrature Amplitude Modulation (QAM) is used. However, any other suitable modulation scheme may be used. Moreover, the modulation scheme utilized by modulator 170 may also be selected based on the channel conditions between the origination device 110 and the signal forwarding device 138. The modulation of the dual-encoded first set of user data yields a dual-encoded received signal 136.

Origination device 110 utilizes transmitter 122 to transmit the dual-encoded received signal 136 to signal forwarding device 138, which receives the transmission via receiver 142. The demodulator 172 of signal forwarding device 138 demodulates the dual-encoded received signal 136 using a demodulation scheme that corresponds to the modulation scheme utilized by modulator 170. The demodulation of the dual-encoded received signal 136 yields the dual-encoded first set of user data.

The Decoder 2, 174, decodes the dual-encoded first set of user data, using decoding parameters that correspond to the second set of encoding parameters, which were used by Encoder 2, 168, of the origination device 110 to encode the single-encoded first set of user data. The result of decoding the dual-encoded first set of user data with Decoder 2 is the single-encoded first set of user data, which is encoded according to the first set of encoding parameters.

After decoding, the second CRC value (CRC 2), which was added to the single-encoded first set of user data by the origination device 110, is checked by CRC 2 Check 176, which detects whether any errors are present in the single-encoded first set of user data after decoding. If the CRC 2 Check 176 detects an error, signal forwarding device 138 can send a negative acknowledgment response (NACK) to the origination device 110, indicating that the dual-encoded received signal 136 was not successfully received. If the CRC 2 Check 176 does not detect an error, signal forwarding device 138 can send a positive acknowledgment response (ACK) to the origination device 110, indicating that the dual-encoded received signal 136 was successfully received. Moreover, if there are no errors, signal forwarding device 138 forwards the single-encoded first set of user data to the modulator 178 and additionally stores a copy of the single-encoded first set of user data in memory 188, to potentially be used at a later time, as will be discussed more fully below.

Modulator 178 of signal forwarding device 138 modulates the single-encoded first set of user data. In the example shown in FIG. 1A, Quadrature Amplitude Modulation (QAM) is used by modulator 178. However, any other suitable modulation scheme may be used. Moreover, the modulation scheme utilized by modulator 178 may also be selected based on the channel conditions between the signal forwarding device 138 and the destination device 114. The modulation of the single-encoded first set of user data yields a single-encoded forwarded signal 148.

Signal forwarding device 138 utilizes transmitter 146 to transmit a first single-encoded forwarded signal 148 to the destination device 114, which receives the transmission via a receiver 130. The demodulator 180 of the destination device 114 demodulates the first single-encoded forwarded signal 148 using a demodulation scheme that corresponds to the modulation scheme utilized by modulator 178. The demodulation of the first single-encoded forwarded signal 148 yields the single-encoded first set of user data contained in the first single-encoded forwarded signal 148.

The Decoder 1, 182, of the destination device 114 decodes the single-encoded first set of user data using decoding parameters that correspond to the first set of encoding parameters, which were used by Encoder 1, 164, of the origination device 110 to encode the first set of user data. The result of decoding the single-encoded first set of user data with Decoder 1 is the first set of user data. After decoding, the first CRC value (CRC 1), which was added to the first set of user data by the origination device 110, is checked by CRC 1 Check 184, which detects whether any errors are present in the first set of user data after decoding.

If the CRC 1 Check 184 does not detect an error, the destination device 114 can send a positive acknowledgment response (ACK) to the signal forwarding device 138 and/or the origination device 110, indicating that the first single-encoded forwarded signal 148 was successfully received. If the destination device 114 sends an ACK to the origination device 110, the ACK can be sent either directly to the origination device 110 or to the origination device 110 via signal forwarding device 138. If there are no errors detected by CRC 1 Check 184, destination device 114 has successfully received and decoded the first set of user data (e.g., received user data 186).

Thus, by dual-encoding the first set of user data at origination device 110 with first and second sets of encoding parameters that are selected based on the channel conditions associated with (1) the communication link between the signal forwarding device 138 and the destination device 114, and (2) the communication link between the origination device 110 and the signal forwarding device 138, respectively, a more robust data delivery system is created.

However, if the CRC 1 Check 184 detects an error, destination device 114 sends a negative acknowledgment response (NACK) to the signal forwarding device 138 and/or the origination device 110, indicating that the first single-encoded forwarded signal 148 was not successfully received and/or decoded. The NACK is considered, for this example, to be a request for retransmission of the single-encoded forwarded signal, which will be transmitted by the signal forwarding device 138. For example, upon receiving the NACK, the signal forwarding device 138 retrieves the stored copy of the single-encoded first set of user data from memory 188. Decoder 1, 190, of signal forwarding device 138 decodes the retrieved single-encoded first set of user data, using decoding parameters that correspond to the first set of encoding parameters. The result of decoding the single-encoded first set of user data with Decoder 1, 190, is the first set of user data.

Although Decoder 1, 190, is shown separately from Decoder 2, 174, in the example of FIG. 1A, the circuitry that performs the functionality of Decoder 1, 190, may be the same circuitry utilized to perform the functionality of Decoder 2, 174. For example, controller 144 of FIG. 1B may be configured to perform the functionality required by Decoder 2, 174, and Decoder 1, 190. In other examples, different circuitry may be utilized to perform the functionality required by Decoder 2, 174, and Decoder 1, 190, respectively.

After decoding with Decoder 1, 190, the first CRC value (CRC 1), which was added to the first set of user data by the origination device 110, is checked by CRC 1 Check 192, which detects whether any errors are present in the first set of user data after decoding. If the CRC 1 Check 192 does not detect an error, the signal forwarding device 138 can send a positive acknowledgment response (ACK) to the origination device 110, indicating that the signal forwarding device 138 has successfully received and decoded the first set of user data (e.g., received user data 186). However, if the CRC 1 Check 192 detects an error, the signal forwarding device 138 sends a negative acknowledgment response (NACK) to the origination device 110, indicating that the first dual-encoded received signal 136 was not successfully received. The NACK is considered, for this example, to be a request for retransmission of the dual-encoded received signal 136, which will be transmitted by the origination device 110.

The signal forwarding device 138 has circuitry configured to add a third cyclic redundancy check value (CRC 3) 196 to the first set of user data. The CRC is an error-detecting code that is used to detect if the received packet at the receiver is in error or not. Although the examples shown herein utilize CRC, any suitable error-detection techniques may be used. After adding CRC 3, the first set of user data is encoded by Encoder 3, 198. Encoder 3 encodes the first set of user data according to a third set of encoding parameters corresponding to channel conditions associated with the communication link between the signal forwarding device 138 and the destination device 114. The third set of encoding parameters comprises a third encoding technique and/or a third encoding rate.

In the example shown in FIG. 1A, the third set of encoding parameters may differ from the first set of encoding parameters, which were initially used by Encoder 1, 164, of the origination device 110 to encode the first set of user data. More specifically, the encoding technique and/or encoding rate of the third set of encoding parameters may differ from the first set of encoding parameters. The result of encoding the first set of user data with Encoder 3 is a second single-encoded first set of user data.

Modulator 178 of signal forwarding device 138 modulates the second single-encoded first set of user data. In the example shown in FIG. 1A, Quadrature Amplitude Modulation (QAM) is used by modulator 178. However, any other suitable modulation scheme may be used. For example, the modulation scheme utilized by modulator 178 may be selected based on the channel conditions between the signal forwarding device 138 and the destination device 114. Moreover, the modulation scheme and/or modulation order used by modulator 178 to modulate the second single-encoded first set of user data may differ from the modulation scheme and/or modulation order utilized to modulate the first single-encoded forwarded signal 148. The modulation of the second single-encoded first set of user data yields a second single-encoded forwarded signal 148.

Signal forwarding device 138 utilizes transmitter 146 to transmit the second single-encoded forwarded signal 148 to the destination device 114. In the example shown in FIG. 1A, the transmit power used to transmit the second single-encoded forwarded signal 148 may differ from the transmit power used to transmit the first single-encoded forwarded signal 148 to the destination device 114. The destination device 114 receives the second single-encoded forwarded signal 148 via receiver 130. Upon receipt of the second single-encoded forwarded signal 148, the demodulator 180 of the destination device 114 demodulates the second single-encoded forwarded signal 148 using a demodulation scheme that corresponds to the modulation scheme utilized by modulator 178. The demodulation of the second single-encoded forwarded signal 148 yields the single-encoded first set of user data contained in the second single-encoded forwarded signal 148.

The Decoder 1, 182, of the destination device 114 decodes the single-encoded first set of user data using decoding parameters that correspond to the third set of encoding parameters, which were used by Encoder 3, 198, of the signal forwarding device 138 to encode the first set of user data. The result of decoding the single-encoded first set of user data with Decoder 1, 182, is the first set of user data. After decoding, the third CRC value (CRC 3), which was added to the first set of user data by the signal forwarding device 138, is checked by CRC 3 Check (not shown in FIG. 1A), which detects whether any errors are present in the first set of user data after decoding.

CRC 3 Check is not shown in FIG. 1A since it is presumed that the same circuitry that performs the functions of CRC 1 Check, 184, is further configured to perform the functions of CRC 3 Check. For example, controller 128 of FIG. 1B may be configured to perform the functionality required by CRC 1 Check, 184, and CRC 3 Check. In other examples, different circuitry may be utilized to perform the functionality required by CRC 1 Check, 184, and CRC 3 Check, respectively. Similarly, although CRC 2 Check, 176, is shown separately from CRC 1 Check, 192, in the example of FIG. 1A, the circuitry that performs the functionality of CRC 1 Check, 192, may be the same circuitry utilized to perform the functionality of CRC 2 Check, 176. For example, controller 144 of FIG. 1B may be configured to perform the functionality required by CRC 1 Check, 192, and CRC 2 Check, 176. In other examples, different circuitry may be utilized to perform the functionality required by CRC 1 Check, 192, and CRC 2 Check, 176, respectively.

If the CRC 3 Check does not detect an error, the destination device 114 can send a positive acknowledgment response (ACK) to the signal forwarding device 138 and/or the origination device 110, indicating that the second single-encoded forwarded signal 148 was successfully received. If the destination device 114 sends an ACK to the origination device 110, the ACK can be sent either directly to the origination device 110 or to the origination device 110 via signal forwarding device 138. If there are no errors detected by CRC 3 Check, destination device 114 has successfully received and decoded the first set of user data (e.g., received user data 186).

Thus, the signal forwarding device 138 decodes the encoding that was applied by Encoder 1, 164, and retransmits the first set of user data to the destination device 114. In some examples, the signal forwarding device 138 retransmits the first set of user data, utilizing one or more different transmission, modulation, and/or encoding parameters than those used to initially transmit the first set of user data to the destination device 114. The signal forwarding device 138 may select the one or more different transmission, modulation, and/or encoding parameters based on channel conditions associated with the communication link between the signal forwarding device 138 and the destination device 114. Thus, this improved method and system efficiently avoids the additional latency experienced in a typical relay scenario that would require the signal forwarding device to transmit the NACK to the origination device and wait for the retransmission from the origination device before the signal forwarding device can retransmit data to the destination device that transmitted the NACK.

If CRC 3 Check detects an error, destination device 114 sends a negative acknowledgment response (NACK) to the signal forwarding device 138, indicating that the second single-encoded forwarded signal 148 was also not successfully received and/or decoded. In response, the signal forwarding device 138 shown in the example of FIG. 1A further modifies one or more of the transmission, modulation, and/or encoding parameters and retransmits the user data to the destination device 114. In other examples, the signal forwarding device 138 forwards the NACK to the origination device 110 so that the origination device 110 can retransmit the first set of user data.

The preceding description of the example shown in FIG. 1A shows that the signal forwarding device 138 does not use Decoder 1, 190, to decode the single-encoded first set of user data until a NACK is received from destination device 114. However, in other examples, Decoder 1, 190, may be used to decode the single-encoded first set of user data, without waiting for a NACK to be received from destination device 114. For example, the signal forwarding device 138 may automatically decode the single-encoded first set of user data, using Decoder 1, 190, and store a copy of the first set of user data, and if a NACK is subsequently received from the destination device 114, the signal forwarding device 138 can efficiently retransmit the first set of user data without having to retrieve and decode the single-encoded first set of user data.

Figure 1B:
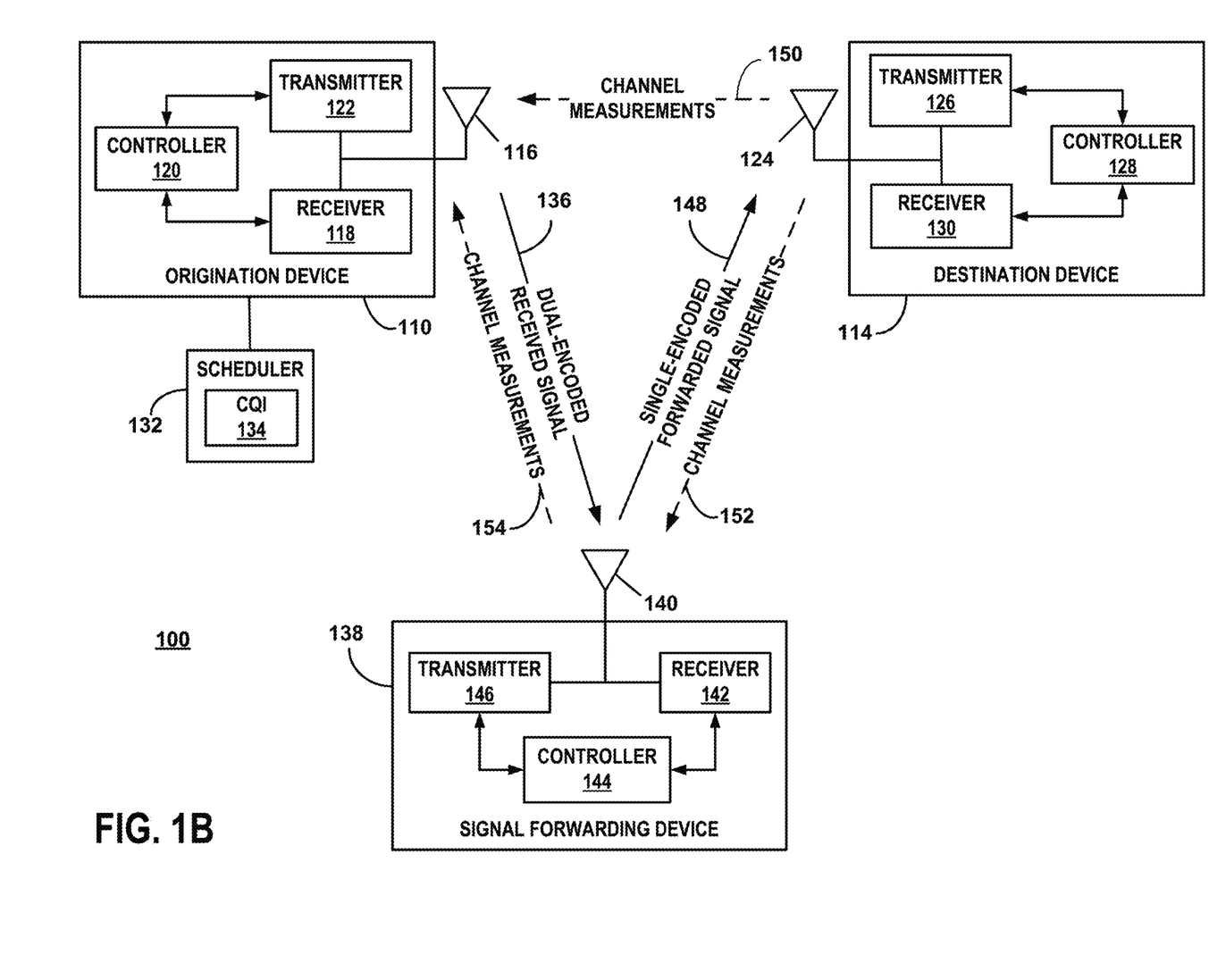
FIG. 1B is a block diagram of an example of a wireless communication system including an origination device, a signal forwarding device, and a destination device.

FIG. 1B is a block diagram of an example of a wireless communication system 100 including an origination device, a signal forwarding device, and a destination device. Although, the system 100 only shows one signal forwarding device and only one destination device, the system 100 may include multiple signal forwarding devices that each serve one or more destination devices. The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices. In still other situations, the origination device 110 is a UE device, and the destination device 114 is a base station.

In the example of FIG. 1B, origination device 110 provides downlink wireless communication service to destination device 114. Thus, destination device 114 receives downlink signals (not shown) from origination device 110, either directly or via signal forwarding device 138. The downlink signals are received at the destination device 114 through antenna 124 and receiver 130. Destination device 114 further comprises a controller 128 and a transmitter 126. Origination device 110 transmits the downlink signals to destination device 114 and to signal forwarding device 138 via antenna 116 and transmitter 122.

Origination device 110 further comprises controller 120 and transmitter 122, as well as other electronics, hardware, and code. The origination device 110 is any fixed, mobile, or portable equipment that performs the functions described herein. The various functions and operations of the blocks described with reference to the origination device 110 may be implemented in any number of devices, circuits, or elements. Two or more of the functional blocks may be integrated in a single device, and the functions described as performed in any single device may be implemented over several devices.

For the example shown in FIG. 1B, the origination device 110 may be a fixed device or apparatus that is installed at a particular location at the time of system deployment. Examples of such equipment include fixed base stations or fixed transceiver stations. In some situations, the origination device 110 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the origination device 110 may be a portable device that is not fixed to any particular location. Accordingly, the origination device 110 may be a portable user device such as a UE device in some circumstances.

The controller 120 includes any combination of hardware, software, and/or firmware for executing the functions described herein as well as facilitating the overall functionality of the origination device 110. An example of a suitable controller 120 includes code running on a microprocessor or processor arrangement connected to memory. The transmitter 122 includes electronics configured to transmit wireless signals. In some situations, the transmitter 122 may include multiple transmitters. The receiver 118 includes electronics configured to receive wireless signals. In some situations, the receiver 118 may include multiple receivers. The receiver 118 and transmitter 122 receive and transmit signals, respectively, through an antenna 116. The antenna 116 may include separate transmit and receive antennas. In some circumstances, the antenna 116 may include multiple transmit and receive antennas.

The transmitter 122 and receiver 118 in the example of FIG. 1B perform radio frequency (RF) processing including modulation and demodulation. The receiver 118, therefore, may include components such as low noise amplifiers (LNAs) and filters. The transmitter 122 may include filters and amplifiers. Other components may include isolators, matching circuits, and other RF components. These components in combination or cooperation with other components perform the origination device functions. The required components may depend on the particular functionality required by the origination device.

The transmitter 122 includes modulator 170 (shown in FIG. 1A), and the receiver 118 includes a demodulator (not shown). The modulator 170 modulates the signals to be transmitted as part of the dual-encoded received signal 136 and can apply any one of a plurality of modulation orders. The demodulator demodulates any signals received at the origination device 110 in accordance with one of a plurality of modulation orders.

Scheduler 132 is located at origination device 110 in the example shown in FIG. 1B. However, the system 100 could be modified so that the scheduler 132 is located at any other suitable location. Regardless of the location of scheduler 132, the system 100 may be configured so that multiple entities within the radio access network (e.g., different origination devices, different signal forwarding devices, and different destination devices) can access the scheduler 132. For example, in an ad-hoc topology, a first origination device can access the scheduler 132 and transmit a dual-encoded received signal to the signal forwarding device at a given time, but a second origination device can access the scheduler 132 and transmit a dual-encoded received signal to the signal forwarding device at a second, different time.

The scheduler may be an application running on equipment connected directly to origination device 110 or connected through a backhaul or other communication link. Regardless of the location of scheduler 132, channel quality information (CQI) 134 regarding the various communication links within the system 100 is provided to scheduler 132, which uses the CQI 134 to schedule communication resources to be used by the various entities within the system 100. For the example shown in FIG. 1B, the scheduler 132 utilizes CQI pertaining to the communication link between the origination device 110 and the destination device 114, CQI pertaining to the communication link between the origination device 110 and the signal forwarding device 138, and CQI pertaining to the communication link between the signal forwarding device 138 and the destination device 114. Based on the channel quality for at least one of these three communication links, the scheduler 132 schedules communication resources.

As discussed above, origination device 110 of FIG. 1B transmits a dual-encoded received signal 136 (e.g. a downlink signal) to the signal forwarding device 138, which receives the dual-encoded received signal 136 via antenna 140 and receiver 142. The signal forwarding device 138 further comprises controller 144 and transmitter 146, as well as other electronics, hardware, and code. The signal forwarding device 138 is any fixed, mobile, or portable equipment that performs the functions described herein. The various functions and operations of the blocks described with reference to the signal forwarding device 138 may be implemented in any number of devices, circuits, or elements. Two or more of the functional blocks may be integrated in a single device, and the functions described as performed in any single device may be implemented over several devices.

For the example shown in FIG. 1B, the signal forwarding device 138 may be a fixed device or apparatus that is installed at a particular location at the time of system deployment. Examples of such equipment include fixed base stations or fixed transceiver stations. In some situations, the signal forwarding device 138 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer.

In still other situations, the signal forwarding device 138 may be a portable device that is not fixed to any particular location. Accordingly, the signal forwarding device 138 may be a portable user device such as a UE device in some circumstances. In some implementations, the signal forwarding device 138 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to the origination device 110 (e.g., anchor eNB). In other implementations, the signal forwarding device 138 may be a drone with cellular capability. Such a drone can easily move about towards locations where the existing coverage from fixed base stations is lacking.

The controller 144 includes any combination of hardware, software, and/or firmware for executing the functions described herein as well as facilitating the overall functionality of the signal forwarding device 138. An example of a suitable controller 144 includes code running on a microprocessor or processor arrangement connected to memory. The transmitter 146 includes electronics configured to transmit wireless signals. In some situations, the transmitter 146 may include multiple transmitters. The receiver 142 includes electronics configured to receive wireless signals. In some situations, the receiver 142 may include multiple receivers. The receiver 142 and transmitter 146 receive and transmit signals, respectively, through an antenna 140. The antenna 140 may include separate transmit and receive antennas. In some circumstances, the antenna 140 may include multiple transmit and receive antennas.

The transmitter 146 and receiver 142 in the example of FIG. 1B perform radio frequency (RF) processing including modulation and demodulation. The receiver 142, therefore, may include components such as low noise amplifiers (LNAs) and filters. The transmitter 146 may include filters and amplifiers. Other components may include isolators, matching circuits, and other RF components. These components in combination or cooperation with other components perform the signal forwarding functions. The required components may depend on the particular signal forwarding scheme that is employed.

The transmitter 146 includes modulator 178 (shown in FIG. 1A), and the receiver 142 includes demodulator 172 (shown in FIG. 1A). The modulator modulates the signals to be transmitted as part of the single-encoded forwarded signal 148 and can apply any one of a plurality of modulation orders. The demodulator demodulates the dual-encoded received signal 136 in accordance with one of a plurality of modulation orders. The modulation order for transmissions to the destination device 114, however, is established by scheduler 132.

As is known, the modulation order determines the number of bits used to generate the modulated symbol. There is a trade-off between modulation order, required energy, and bit-error rate (BER). As the modulation order is increased, the average energy per bit must also be increased to maintain the same BER. In the example shown in FIG. 1B, the signal forwarding device 138 utilizes a lower-order modulation symbol to modulate the single-encoded first set of user data before transmitting the single-encoded forwarded signal 148. This scenario occurs because a typical link between the signal forwarding device 138 and the destination device 114 has a relatively lower signal-to-noise ratio (SNR) compared to the link between the origination device 110 and the signal forwarding device 138. In some situations, for example, the origination device-to-signal forwarding device (OD-SFD) channel between the origination device 110 and the signal forwarding device 138 is typically static because both devices are fixed, whereas the signal forwarding device-to-destination device (SFD-DD) channel between the signal forwarding device 138 and the destination device 114 is generally dynamic because the destination device 114 is mobile. Accordingly, the origination device 110 may utilize a higher-order modulation order when the communication link between the origination device 110 and the signal forwarding device 138 is static, which yields a relatively higher SNR compared to the communication link between the signal forwarding device 138 and the destination device 114.

As described above, the signal forwarding device 138 receives the dual-encoded received signal 136 with antenna 140 and receiver 142. The signal forwarding device 138 demodulates the dual-encoded received signal 136 with demodulator 172 of FIG. 1A, which yields the dual-encoded first set of user data. The dual-encoded first set of user data is decoded with Decoder 2, 174, of FIG. 1A, which yields a single-encoded first set of user data.

Upon successful decoding by Decoder 2, signal forwarding device 138 modulates the single-encoded first set of user data with modulator 178 of FIG. 1A, which yields a first single-encoded forwarded signal 148. The signal forwarding device 138 transmits the first single-encoded forwarded signal 148 via transmitter 146 and antenna 140 to the destination device 114. For the examples discussed herein, the single-encoded forwarded signals 148 are transmitted within a single frequency band of the SFD-DD channel. The incoming dual-encoded received signal 136 is transmitted within an origination device-to-signal forwarding device channel (OD-SFD channel), which also includes a single frequency band. However, any combination of frequency bands and frequency sub-bands may be used for the OD-SFD channel and the SFD-DD channel.

In some examples, upon receiving the dual-encoded received signal 136, the controller 144 of the signal forwarding device 138 is configured to measure the dual-encoded received signal 136 to obtain channel measurements associated with the OD-SFD channel between the origination device 110 and the signal forwarding device 138. After measuring the dual-encoded received signal 136, the transmitter 146 of the signal forwarding device 138 transmits the OD-SFD channel measurements to the origination device 110. The OD-SFD channel measurements are transmitted to origination device 110, as indicated by dashed signal line 154 in FIG. 1B. In this manner, the origination device 110, using receiver 118, receives channel feedback regarding the channel conditions associated with the communication link between the origination device 110 and the signal forwarding device 138. Of course, in other examples, the origination device 110 can also obtain its own channel measurements regarding the channel conditions associated with the communication link between the origination device 110 and the signal forwarding device 138 by measuring incoming signals from the signal forwarding device 138. After receiving the OD-SFD channel feedback, origination device 110 can modify one or more of the transmission, modulation, and/or encoding parameters used by transmitter 122, modulator 170, and Encoder 2, 168, respectively, based on the received channel feedback regarding the channel conditions associated with the communication link between the origination device 110 and the signal forwarding device 138.

The destination device 114 receives the first single-encoded forwarded signal 148 via antenna 124 and receiver 130. The destination device 114 further comprises controller 128 and transmitter 126, as well as other electronics, hardware, and code. The destination device 114 is any fixed, mobile, or portable equipment that performs the functions described herein. The various functions and operations of the blocks described with reference to the destination device 114 may be implemented in any number of devices, circuits, or elements. Two or more of the functional blocks may be integrated in a single device, and the functions described as performed in any single device may be implemented over several devices.

The controller 128 includes any combination of hardware, software, and/or firmware for executing the functions described herein as well as facilitating the overall functionality of the destination device 114. An example of a suitable controller 128 includes code running on a microprocessor or processor arrangement connected to memory. The transmitter 126 includes electronics configured to transmit wireless signals. In some situations, the transmitter 126 may include multiple transmitters. The receiver 130 includes electronics configured to receive wireless signals. In some situations, the receiver 130 may include multiple receivers. The receiver 130 and transmitter 126 receive and transmit signals, respectively, through an antenna 124. The antenna 124 may include separate transmit and receive antennas. In some circumstances, the antenna 124 may include multiple transmit and receive antennas.

The transmitter 126 and receiver 130 in the example of FIG. 1B perform radio frequency (RF) processing including modulation and demodulation. The receiver 130, therefore, may include components such as low noise amplifiers (LNAs) and filters. The transmitter 126 may include filters and amplifiers. Other components may include isolators, matching circuits, and other RF components. These components in combination or cooperation with other components perform the destination device functions. The required components may depend on the particular functionality required by the destination device.

The transmitter 126 includes a modulator (not shown), and the receiver 130 includes demodulator 180 (shown in FIG. 1A). The modulator modulates the signals to be transmitted as part of the channel measurement signals 150, 152 and can apply any one of a plurality of modulation orders. The demodulator demodulates the single-encoded forwarded signals 148 in accordance with one of a plurality of modulation orders.

As described above, the destination device 114 receives the single-encoded forwarded signals 148 with antenna 124 and receiver 130. The destination device 114 demodulates the first single-encoded forwarded signal 148 with demodulator 180 of FIG. 1A, which yields the single-encoded first set of user data. The single-encoded first set of user data is decoded with Decoder 1, 182, of FIG. 1A, which uses decoding parameters that correspond to the first set of encoding parameters utilized by Encoder 1, 164. The decoding with Decoder 1, 182, yields the first set of user data (e.g., received user data 186). If the first set of user data is successfully obtained, the destination device 114 sends an ACK to the signal forwarding device 138 and/or the origination device 110.

However, if Decoder 1, 182, does not successfully decode the single-encoded first set of user data, destination device 114 sends a NACK to the signal forwarding device 138 and/or the origination device 110, indicating that the first single-encoded forwarded signal 148 was not successfully received and decoded. Upon receiving the NACK, the signal forwarding device 138 retrieves the stored copy of the single-encoded first set of user data from memory 188. Decoder 1, 190, of signal forwarding device 138 decodes the retrieved single-encoded first set of user data, using decoding parameters that correspond to the first set of encoding parameters. The result of decoding the single-encoded first set of user data with Decoder 1, 190, is the first set of user data.

After decoding, the first set of user data is encoded by Encoder 3, 198. Encoder 3 encodes the first set of user data according to a third set of encoding parameters corresponding to channel conditions associated with the communication link between the signal forwarding device 138 and the destination device 114. The third set of encoding parameters comprises a third encoding technique and/or a third encoding rate.

As discussed previously, the third set of encoding parameters may differ from the first set of encoding parameters, which were initially used by the origination device 110 to encode the first set of user data. More specifically, the encoding technique and/or encoding rate of the third set of encoding parameters may differ from the encoding technique and/or encoding rate of the first set of encoding parameters. The result of encoding the first set of user data with Encoder 3 is a second single-encoded first set of user data. Modulator 178 of signal forwarding device 138 modulates the second single-encoded first set of user data. The modulation scheme utilized by modulator 178 to modulate the second single-encoded first set of user data may be the same as, or may be different from, the modulation scheme utilized to modulate the first single-encoded first set of user data. The modulation of the second single-encoded first set of user data yields a second single-encoded forwarded signal 148.

Signal forwarding device 138 utilizes transmitter 146 to transmit the second single-encoded forwarded signal 148 to the destination device 114. In the example shown in FIG. 1B, the transmit power used to transmit the second single-encoded forwarded signal 148 may differ from the transmit power used to transmit the first single-encoded forwarded signal 148 to the destination device 114. The destination device receives the second single-encoded forwarded signal 148 via receiver 130.

Upon receipt of the second single-encoded forwarded signal 148, the demodulator 180 of the destination device 114 demodulates the second single-encoded forwarded signal 148 using a demodulation scheme that corresponds to the modulation scheme utilized by modulator 178. The demodulation of the second single-encoded forwarded signal 148 yields the single-encoded first set of user data contained in the second single-encoded forwarded signal 148. The Decoder 1, 182, of the destination device 114 decodes the single-encoded first set of user data using decoding parameters that correspond to the third set of encoding parameters, which were used by Encoder 3, 198, of the signal forwarding device 138 to encode the first set of user data. The result of decoding the single-encoded first set of user data with Decoder 1, 182 is the first set of user data.

In some examples, upon receiving the single-encoded forwarded signal 148, the controller 128 of the destination device 114 is configured to measure the single-encoded forwarded signal 148 to obtain channel measurements associated with a signal forwarding device-to-destination device (SFD-DD) channel between the signal forwarding device 138 and the destination device 114. After measuring the single-encoded forwarded signal 148, the transmitter 126 of destination device 114 transmits the SFD-DD channel measurements to the origination device 110. The SFD-DD channel measurements can be transmitted directly to origination device 110, as indicated by dashed signal line 150 in FIG. 1B. Alternatively, the SFD-DD channel measurements can be initially transmitted to signal forwarding device 138, as indicated by dashed signal line 152, and signal forwarding device 138 can subsequently transmit the SFD-DD channel measurements to origination device 110, as indicated by dashed signal line 154.

Of course, in other examples, the signal forwarding device 138 can also obtain its own channel measurements regarding the channel conditions associated with the communication link between the signal forwarding device 138 and the destination device 114 by measuring incoming signals from the destination device 114. The signal forwarding device 138 may then transmit its own channel measurements to the origination device 110. Thus, there are multiple ways in which the origination device 110, using receiver 118, can receive channel feedback regarding the channel conditions associated with the communication link between the signal forwarding device 138 and the destination device 114.

After receiving the SFD-DD channel feedback from the destination device 114 and/or the signal forwarding device 138, controller 120 of origination device 110 can modify the encoding parameters used by Encoder 1, 164, based on the received channel feedback regarding the channel conditions associated with the communication link between the signal forwarding device 138 and the destination device 114. Similarly, the signal forwarding device 138 may utilize the SFD-DD channel measurements, regardless of whether the measurements are received from the destination device 114 or are obtained by the signal forwarding device 138, itself. For example, the signal forwarding device 138 may utilize the SFD-DD channel measurements to modify the encoding, modulation, and/or transmission parameters utilized to encode, modulate, and/or transmit signals to the destination device 114.

In some examples, destination device 114 can also transmit the SFD-DD channel measurements to origination device 110, either directly or indirectly through signal forwarding device 138, as part of a feedback signal. Alternatively, the SFD-DD channel measurements can be transmitted separately from the feedback signal. For example, the feedback signal can include a downlink channel feedback report comprising downlink channel measurements related to one or more downlink signals received by the destination device 114. For example, the downlink channel feedback report may contain downlink channel measurements for downlink signals received from the origination device 110 and/or downlink channel measurements for one or more downlink signals received from one or more base stations other than origination device 110. The downlink channel feedback report can additionally include the location of the resources (e.g., time slots, subcarriers, reference signal, etc.) on which the downlink channel measurements were made.

The downlink channel feedback report may also identify a carrier on which the downlink channel measurements were made, a cell identifier associated with origination device 110 that transmitted the downlink signals, and/or a spatial vector associated with a beamformed downlink signal. In some examples, the downlink channel feedback report may identify a cell identifier associated with a base station, other than origination device 110, that transmitted the downlink signal. This scenario might occur when the downlink signal is received from a base station other than origination device 110, but the destination device 114 needs to submit the downlink channel feedback report to the scheduler 132 located at the origination device 110.

In yet another scenario, destination device 114 can receive downlink signals from a first device (e.g., origination device 110), as the primary carrier of the downlink signals, and can also receive downlink signals from a second device (e.g., signal forwarding device 138 or a base station other than origination device 110), as the secondary carrier of the downlink signals. In such a scenario, the downlink channel feedback report may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

Alternatively, the feedback signal can include an acknowledgment response, which can be either a positive acknowledgment response (ACK) or a negative acknowledgment response (NACK). The ACK message indicates that a downlink signal was successfully received by the destination device 114. The NACK message indicates that the downlink signal was not successfully received by the destination device 114. In some situations, the ACK/NACK message is a message that is forwarded on to the origination device 110 by the signal forwarding device 138. In other situations, the ACK/NACK message is intended for the signal forwarding device 138. In still other situations, the ACK message can be an indication to both the signal forwarding device 138 and the origination device 110. In scenarios in which the feedback signal includes an acknowledgment response, the feedback signal may additionally identify a carrier on which the downlink signal was received, a cell identifier associated with origination device 110 that transmitted the downlink signal, a cell identifier associated with a base station, other than origination device 110, that transmitted the downlink signal, and/or a spatial vector associated with a beamformed downlink signal. Regardless of the contents of the feedback signal, the SFD-DD channel measurements can be transmitted along with, or separate from, the feedback signal to the origination device 110, either directly or through signal forwarding device 138.

In this regard, if system 100 of FIG. 1B utilizes a Hybrid Automatic Repeat Request (HARQ) process for error-correction and error-control, each ACK/NACK transmitted from the signal forwarding device 138 and the destination device 114 may include an identifier in order to identify the device that initially transmitted the ACK/NACK. In some cases, the HARQ Process ID may also be used. When using the HARQ mechanism, the receiver and the transmitter should know some information about the Process ID for each of the HARQ processes, so that the receiver can successfully track each of the HARQ process data without getting them mixed up. In this case, the HARQ process ID could be included along with the identifier for the identity of the device.

Figure 2:
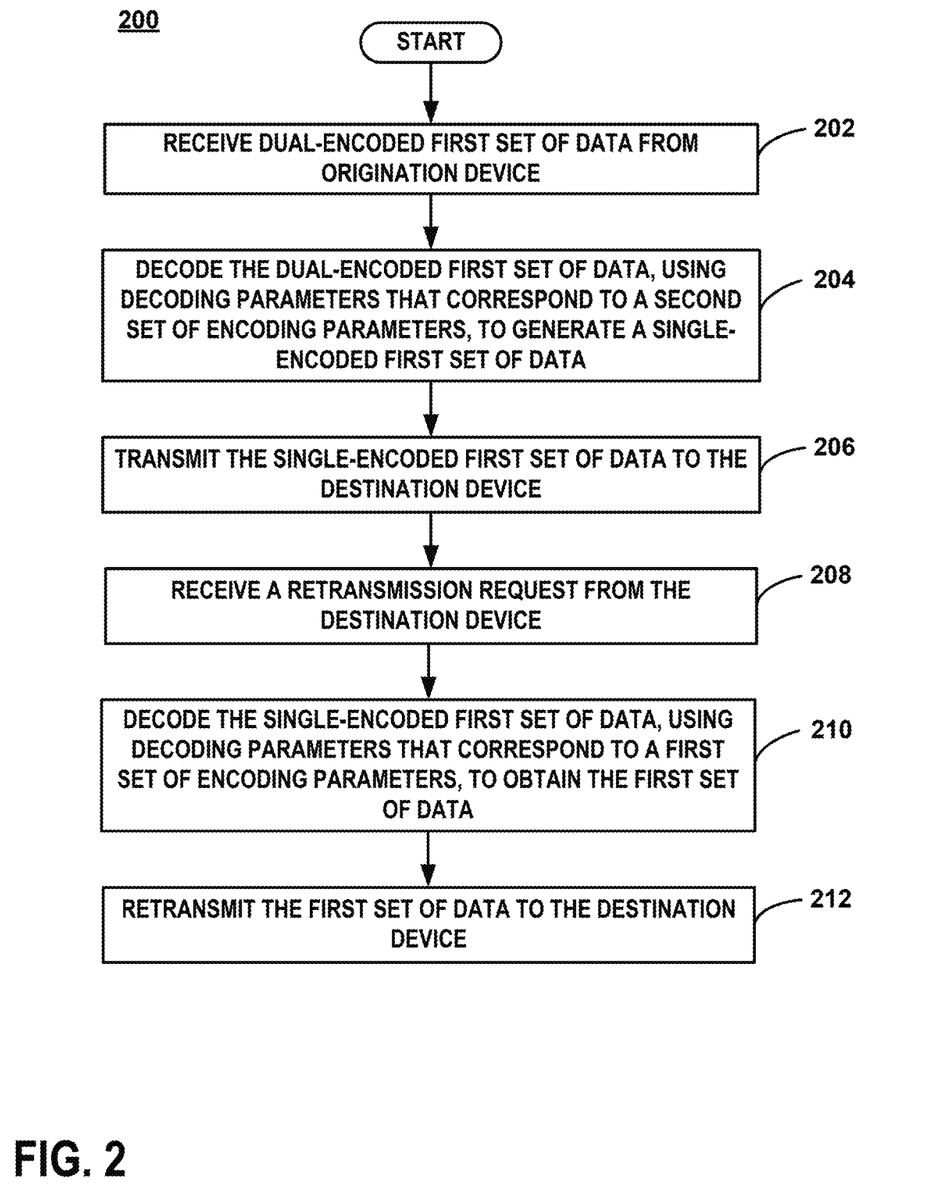
FIG. 2 is a flowchart of an example of a method of utilizing the wireless communication system of FIG. 1B to transmit dual-encoded data.

FIG. 2 is a flowchart of an example of a method of utilizing the wireless communication system of FIG. 1B to transmit dual-encoded data. The method begins, at step 202, with the signal forwarding device 138 receiving a dual-encoded received signal 136 from the origination device 110. The dual-encoded received signal 136 contains a dual-encoded first set of data. In order to generate the dual-encoded first set of data, a first set of data is encoded according to a first set of encoding parameters to produce an encoded first set of data, and the encoded first set of data is further encoded according to a second set of encoding parameters. In the example shown in FIG. 2, the first set of encoding parameters corresponds to channel conditions associated with a first communication link between the signal forwarding device 138 and the destination device 114, and the second set of encoding parameters corresponds to channel conditions associated with a second communication link between the origination device 110 and the signal forwarding device 138.

At step 204, the signal forwarding device 138 decodes the dual-encoded first set of data, using decoding parameters that correspond to the second set of encoding parameters, to obtain a single-encoded first set of data that is encoded according to the first set of encoding parameters. At step 206, the signal forwarding device 138 transmits the single-encoded first set of data to a destination device 114. The destination device 114 receives the single-encoded first set of data and attempts to decode the single-encoded first set of data using decoding parameters that correspond to the first set of encoding parameters. If the decoding procedure is successful, the destination device 114 will have successfully received the user data and will transmit an ACK to the signal forwarding device 138 and/or the origination device 110.

If the decoding procedure is unsuccessful, the destination device 114 will transmit a retransmission request (e.g., NACK) to the signal forwarding device 138 and/or the origination device 110. At step 208, the signal forwarding device 138 receives the retransmission request (e.g., NACK) from the destination device 114. The retransmission request can be received directly from the destination device 114 or via the origination device 110. At step 210, the signal forwarding device 138 decodes the single-encoded first set of data that was stored in memory 188, using decoding parameters that correspond to the first set of encoding parameters, to obtain the first set of data.

At step 212, the signal forwarding device 138 retransmits the first set of data to the destination device 114. In some cases, the transmit power for the retransmitting is different than a transmit power previously used to transmit the single-encoded first set of data to the destination device 114. For example, the transmit power for the retransmitting may be based, at least partially, on channel conditions associated with a first communication link between the signal forwarding device 138 and the destination device 114.

In other examples, retransmitting the first set of data includes transmitting the first set of data using a different modulation order and/or technique than a modulation order and/or technique previously used to transmit the single-encoded first set of data to the destination device 114. In still other examples, retransmitting the first set of data includes transmitting the first set of data using a different encoding rate and/or technique than an encoding rate and/or technique previously used to transmit the single-encoded first set of data to the destination device 114. In still further examples, one or more of the transmit power, modulation order and/or technique, encoding rate and/or technique are modified. In these cases, a signal forwarding device 138 may transmit one or more control signals to the destination device 114, indicating the new parameters that have been utilized to retransmit the first set of data, and in this manner, the destination device 114 is made aware of the modifications and can reconfigure the receiver 130, the demodulator 180, and/or the Decoder 1, 182 in order to successfully detect and decode the retransmission.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a signal forwarding device, the method comprising:
   receiving, from an origination device, a dual-encoded first set of data, where a first set of data is encoded according to a first set of encoding parameters to produce an encoded first set of data, which is further encoded according to a second set of encoding parameters to generate the dual-encoded first set of data;
   decoding the dual-encoded first set of data, using decoding parameters that correspond to the second set of encoding parameters, to generate a single-encoded first set of data that is encoded according to the first set of encoding parameters;
   transmitting the single-encoded first set of data to a destination device;
   receiving a retransmission request from the destination device;
   decoding the single-encoded first set of data, using decoding parameters that correspond to the first set of encoding parameters, to obtain the first set of data; and
   retransmitting the first set of data to the destination device.

2. The method of claim 1, wherein the first set of encoding parameters corresponds to channel conditions associated with a first communication link between the signal forwarding device and the destination device, and the second set of encoding parameters corresponds to channel conditions associated with a second communication link between the origination device and the signal forwarding device.

3. The method of claim 1, wherein a transmit power for the retransmitting is different than a transmit power previously used to transmit the single-encoded first set of data to the destination device.

4. The method of claim 3, wherein the transmit power for the retransmitting is based, at least partially, on channel conditions associated with a first communication link between the signal forwarding device and the destination device.

5. The method of claim 1, wherein retransmitting the first set of data comprises:
transmitting the first set of data using a different modulation order than a modulation order previously used to transmit the single-encoded first set of data to the destination device.

6. The method of claim 1, wherein retransmitting the first set of data comprises:
transmitting the first set of data using a different encoding rate than an encoding rate previously used to transmit the single-encoded first set of data to the destination device.

7. The method of claim 1, wherein retransmitting the first set of data comprises at least one of:
transmitting the first set of data using a different modulation order than a modulation order previously used to transmit the single-encoded first set of data to the destination device, and
transmitting the first set of data using a different encoding rate than an encoding rate previously used to transmit the single-encoded first set of data to the destination device,
the method further comprising transmitting a control signal to the destination device indicating at least one of the different modulation order and the different encoding rate.

8. A signal forwarding device comprising:
a receiver configured to receive, from an origination device, a dual-encoded first set of data, where a first set of data is encoded according to a first set of encoding parameters to produce an encoded first set of data, which is further encoded according to a second set of encoding parameters to generate the dual-encoded first set of data;
circuitry configured to decode the dual-encoded first set of data, using decoding parameters that correspond to the second set of encoding parameters, to generate a single-encoded first set of data that is encoded according to the first set of encoding parameters; and
a transmitter configured to transmit the single-encoded first set of data to a destination device,
the receiver further configured to receive a retransmission request from the destination device, the circuitry further configured to decode the single-encoded first set of data, using decoding parameters that correspond to the first set of encoding parameters, to obtain the first set of data, and the transmitter further configured to retransmit the first set of data to the destination device.

9. The signal forwarding device of claim 8, wherein the first set of encoding parameters corresponds to channel conditions associated with a first communication link between the signal forwarding device and the destination device, and the second set of encoding parameters corresponds to channel conditions associated with a second communication link between the origination device and the signal forwarding device.

10. The signal forwarding device of claim 8, wherein a transmit power used to retransmit the first set of data is different than a transmit power previously used to transmit the single-encoded first set of data to the destination device.

11. The signal forwarding device of claim 10, wherein the transmit power used to retransmit the first set of data is based, at least partially, on channel conditions associated with a first communication link between the signal forwarding device and the destination device.

12. The signal forwarding device of claim 8, wherein the transmitter is further configured to retransmit the first set of data using a different modulation order than a modulation order previously used to transmit the single-encoded first set of data to the destination device.

13. The signal forwarding device of claim 8, further comprising:
circuitry configured to encode the first set of data, before retransmitting the first set of data to the destination device, using a different encoding rate than an encoding rate previously used to transmit the single-encoded first set of data to the destination device.

14. A system comprising:
an origination device comprising:
circuitry configured to generate a dual-encoded first set of data, where a first set of data is encoded according to a first set of encoding parameters to produce an encoded first set of data, which is further encoded according to a second set of encoding parameters, and
a transmitter configured to transmit the dual-encoded first set of data;
a signal forwarding device comprising:
a receiver configured to receive the dual-encoded first set of data,
circuitry configured to decode the dual-encoded first set of data, using decoding parameters that correspond to the second set of encoding parameters, to generate a single-encoded first set of data that is encoded according to the first set of encoding parameters, and
a transmitter configured to transmit the single-encoded first set of data to a destination device; and
a destination device comprising:
a receiver configured to receive the single-encoded first set of data,
circuitry configured to decode the single-encoded first set of data, using decoding parameters that correspond to the first set of encoding parameters, and
a transmitter configured to transmit, upon an unsuccessful attempt to decode the single-encoded first set of data, a retransmission request to the signal forwarding device,
the receiver of the signal forwarding device further configured to receive the retransmission request from the destination device, the circuitry of the signal forwarding device further configured to decode the single-encoded first set of data, using decoding parameters that correspond to the first set of encoding parameters, to obtain the first set of data, and the transmitter of the signal forwarding device further configured to retransmit the first set of data to the destination device.

15. The system of claim 14, wherein the first set of encoding parameters corresponds to channel conditions associated with a first communication link between the signal forwarding device and the destination device, and the second set of encoding parameters corresponds to channel conditions associated with a second communication link between the origination device and the signal forwarding device.

16. The system of claim 14, wherein a transmit power used to retransmit the first set of data is different than a transmit power previously used to transmit the single-encoded first set of data to the destination device.

17. The system of claim 16, wherein the transmit power used to retransmit the first set of data is based, at least partially, on channel conditions associated with a first communication link between the signal forwarding device and the destination device.

18. The system of claim 14, wherein the transmitter is further configured to retransmit the first set of data using a different modulation order than a modulation order previously used to transmit the single-encoded first set of data to the destination device.

19. The system of claim 14, further comprising:
    circuitry configured to encode the first set of data, before retransmitting the first set of data to the destination device, using a different encoding rate than an encoding rate previously used to transmit the single-encoded first set of data to the destination device.

* * * * *